United States Patent [19]

Zalenski et al.

[11] Patent Number: 4,996,393
[45] Date of Patent: Feb. 26, 1991

[54] DIGITIZER TABLET WITH SPLIT-CURRENT CONDUCTOR ARRAY

[75] Inventors: Thomas C. Zalenski, Killingworth; Jamie L. Barbetti, Milford, both of Conn.

[73] Assignee: Summagraphics Corporation, Seymour, Conn.

[21] Appl. No.: 503,537

[22] Filed: Apr. 3, 1990

[51] Int. Cl.$^5$ ............................................. G08C 21/00
[52] U.S. Cl. ............................................. 178/19
[58] Field of Search ............................. 178/19, 18

[56] References Cited

U.S. PATENT DOCUMENTS

| | | | |
|---|---|---|---|
| 4,029,899 | 6/1977 | Gordon | 178/19 |
| 4,213,005 | 7/1980 | Cameron | 178/18 |
| 4,554,409 | 11/1985 | Mitsui | 178/19 |
| 4,616,107 | 10/1986 | Abe | 178/18 |
| 4,672,155 | 6/1987 | Narvse | |
| 4,734,546 | 3/1988 | Landmeier | 178/19 |
| 4,794,209 | 12/1988 | Asada | 178/19 |
| 4,835,347 | 5/1989 | Watson | 178/19 |

*Primary Examiner*—Stafford D. Schreyer
*Attorney, Agent, or Firm*—Rosen, Dainow & Jacobs

[57] ABSTRACT

An electromagnetic digitizer system employing an interleaved array of individual conductors each in a W configuration bent into plural sections to define plural parallel portions distributed in different segments of a tablet such that each section comprises a center conductor portion connected in series with outer parallel portions such that the current in the center conductor portion splits or divides among the outer conductors and also flows in the opposite direction. Each of the plural sections defines two tablet coarse positions for a pointing device. Interpolation is employed to determine a fine position.

34 Claims, 11 Drawing Sheets

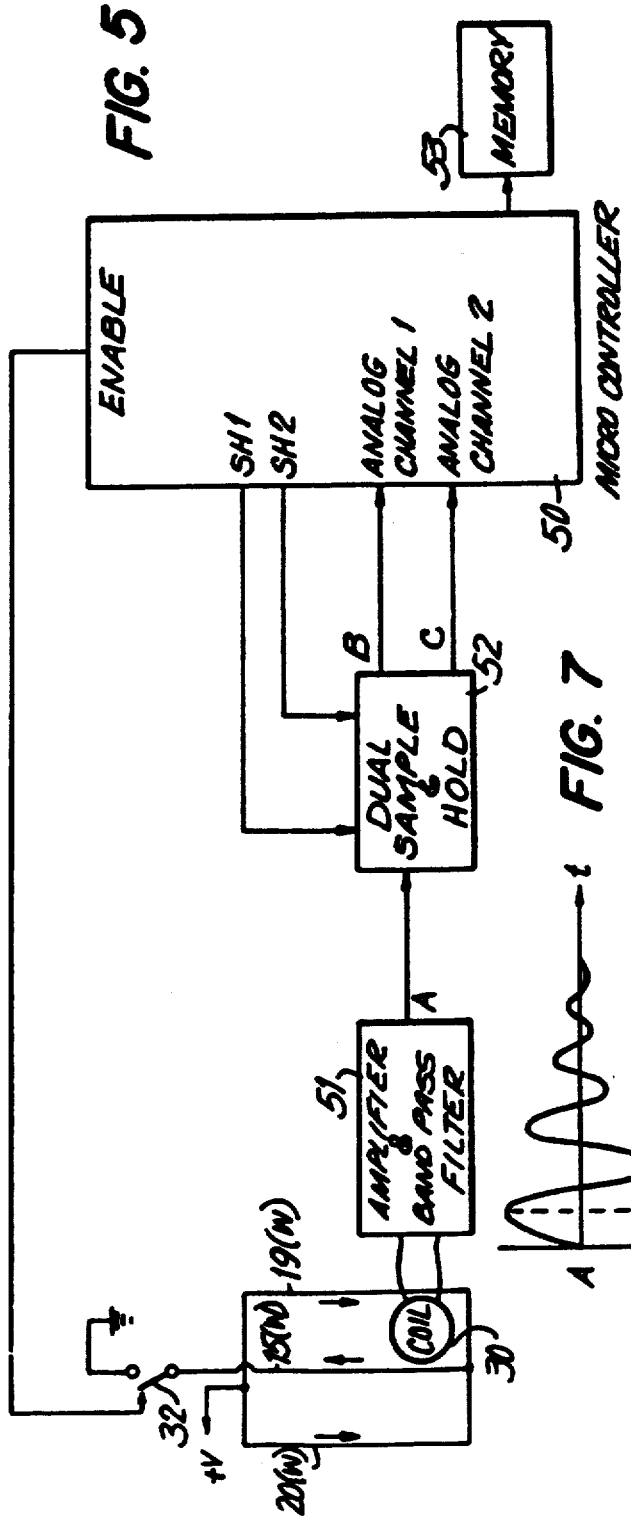

WIRE NUMBER TO COARSE POSITION LOOK-UP TABLE

WIRE #16 POSITIVE SIGNAL

POS_LEFT / NEG_LEFT

| IF MAXIMUM SIGNAL IS POSITIVE | | IF MAXIMUM SIGNAL IS NEGATIVE | |
|---|---|---|---|
| WIRE NUMBER | COARSE POSITION | WIRE NUMBER | COARSE POSITION |
| 1 | 1 | 1 | 4 |
| 2 | 2 | 2 | 5 |
| 3 | 3 | 3 | 6 |
| 4 | 7 | 4 | 10 |
| 5 | 8 | 5 | 11 |
| 6 | 9 | 6 | 12 |
| 7 | 13 | 7 | 16 |
| 8 | 14 | 8 | 17 |
| 9 | 15 | 9 | 18 |
| 10 | 19 | 10 | 22 |
| 11 | 20 | 11 | 23 |
| 12 | 21 | 12 | 24 |
| 13 | 25 | 13 | 28 |
| 14 | 26 | 14 | 29 |
| 15 | 27 | 15 | 30 |

WIRE #16 NEGATIVE SIGNAL

POS_RIGHT / NEG_RIGHT

| IF MAXIMUM SIGNAL IS POSITIVE | | IF MAXIMUM SIGNAL IS NEGATIVE | |
|---|---|---|---|
| WIRE NUMBER | COARSE POSITION | WIRE NUMBER | COARSE POSITION |
| 1 | 31 | 1 | 34 |
| 2 | 32 | 2 | 35 |
| 3 | 33 | 3 | 36 |
| 4 | 37 | 4 | 40 |
| 5 | 38 | 5 | 41 |
| 6 | 39 | 6 | 42 |
| 7 | 43 | 7 | 46 |
| 8 | 44 | 8 | 47 |
| 9 | 45 | 9 | 48 |
| 10 | 49 | 10 | 52 |
| 11 | 50 | 11 | 53 |
| 12 | 51 | 12 | 54 |
| 13 | 55 | 13 | 58 |
| 14 | 56 | 14 | 59 |
| 15 | 57 | 15 | 60 |

FIG. 10

DIGITIZER TABLET WITH SPLIT-CURRENT CONDUCTOR ARRAY

This invention relates to electromagnetic digitizer tablets, and in particular to such a digitizer tablet with a novel electrode arrangement.

BACKGROUND OF INVENTION

Digitizer tablets are well-known. See, for example, the review article in Byte, January 1989, pages 162-174. The most popular types employ electromagnetic technology of the so-called travelling-wave type exemplified by Kamm U.S. Pat. No. 3,904,822 and Zimmer U.S. Pat. No. 4,368,351. This type operates by sequentially exciting the conductors or wires of a regular grid to cause, in effect, an electromagnetic field or wave to travel along the tablet in the direction of one of its coordinate axes. The wave induces in a coil in a pointing device over the tablet an electrical signal which when processed peaks in one polarity before the coil and peaks in the opposite polarity after the coil. The coil center is located by measuring the time for the travelling wave to pass under the coil. This mode of operation requires separate pulsing of each wire of the grid, logic and counter circuits for the time measurement, and phase detector circuitry for detecting the phase change in the induced signal as it crosses the coil. The result is that considerable circuit components are required to achieve user requirements of resolution and accuracy. A reverse mode of operation excites the coil and then scans the wires in sequence to detect the phase change of the voltages induced in the wires. This tablet construction also requires excessive circuit components.

Many proposals have been made to reduce the required circuitry and thereby reduce the manufacturing cost of such devices. A principal goal has been to reduce the number of individual wires that have to be individually excited or scanned. For example, a popular 12 inch×12 inch tablet employs 64 active wire portions made up of 64 individual wires. To scan with a common detector or excite from a common pulse source 64 separate wires requires a 1×64 multiplexer (MUX), typically obtained by cascading one 1×4 MUX with four 1×16 MUXs, a total of five components. Reducing the number of active wire portions to reduce the number of components will, for a given size of table however, sacrifice resolution.

SUMMARY OF INVENTION

An object of the invention is a low-cost digitizer tablet employing electromagnetic technology.

Another object is a digitizer tablet employing fewer individual electrode conductors without sacrificing resolution.

A further object of the invention is an electromagnetic digitizer tablet employing fewer electrical components and yet satisfying state-of-the-art resolution and accuracy specifications.

These and other objects of the invention are achieved in accordance with one aspect of the invention by employing for the electrode array for each coordinate axis a conductor arrangement of parallel conductors in which each individual conductor requiring separate scanning or excitation comprises a common portion which splits or divides into plural parallel portions, with each of the common and each one of the plural portions carrying related currents and with each common portion being spaced from and defining with each of the plural portions at least one coarse position of a pointing device electromagnetically coupled to the conductors. In accordance with a preferred embodiment of this aspect of the invention, eac separate conductor has a generally W configuration with a common middle portion divided into two parallel outer portions, with the related current carried by each of the parallel portions being substantially one-half of that of the middle portion.

In accordance with a further aspect of the invention, each individual conductor comprises at least two connected sections, with each section comprising a common portion dividing into plural parallel portions, and with each section located in a different segment of the tablet, with the result that each conductor defines two times the number-of-sections coarse positions for the pointing device. In accordance with a preferred embodiment of this aspect of the invention, eac individual conductor comprises a generally W configuration bent into the shape of a U to form two sections per conductor and thus four coarse positions per conductor.

In accordance with a further aspect of the invention, means are provided to distinguish plural coarse positions of the pointing device. For individual conductors containing only one section, the distinguishing means is based on detecting the polarity of induced signals. For individual conductors containing plural sections, the distinguishing means further comprises additional conductors to distinguish the section location of a course position.

SUMMARY OF DRAWINGS

These and further objects and advantages of the invention will be best understood in connection with the detailed description that follows of several embodiments of the invention, taken in conjunction with the accompanying drawings, wherein:

FIG. 5 is a block diagram of the circuitry for exciting the conductor configuration of FIG. 3.

FIG. 6 is a waveform of the excitation pulses used in the FIG. 5 arrangement;

FIGS. 7, 8 and 9 depicts waveforms at certain nodes of the FIG. 5 schematic;

FIG. 10 is a chart depicting several arrays used as look-up tables in the operation of the embodiment of FIG. 1;

DETAILED DESCRIPTION OF PREFERRED EMBODIMENTS

Many of the constructional details and circuitry of the present invention are similar to that described in the referenced patents and many others that describe digitizer tablets employing electromagnetic technology. Hence, the description that follows will focus on the differences between the present invention and the known tablets. Further, as is common in most patent descriptions, it will be recognized that the digitizer tablet employs one grid array for the X-coordinate location, and an identical grid array, turned 90°, for the Y coordinate. The operation is identical for either coordinate. As is typical, a single common exciting and processing circuit is provided, so that, typically, the X-coordinate signals are first obtained followed by subsequent processing to obtain the Y-coordinate signals. Hence, the description herein will be given only for the electrode array to generate the X-coordinate of the pointing device, it being understood that a second electrode array, rotated 90°, will be provided and signals generated and processed in the identical manner if it is desired to locate the pointing device position with respect to two coordinate axes, namely, the X and Y axes. Also, when referring to the electrodes or electrode array of the tablet, it will be understood that each conductor is typically an electrically-conductive trace or deposit on a PCB. But, the invention is not limited thereto and will apply to any form of low-ohmic current-carrying medium which is functionally equivalent to a metallic wire. In the description that follows, the terms "conductor" and "wire" are used interchangeably and are not meant to have a limiting sense.

The embodiment that will now be described, which is one of the preferred embodiments of the invention, employs sixteen W-configured wires each comprising two sections.

Figure 1:
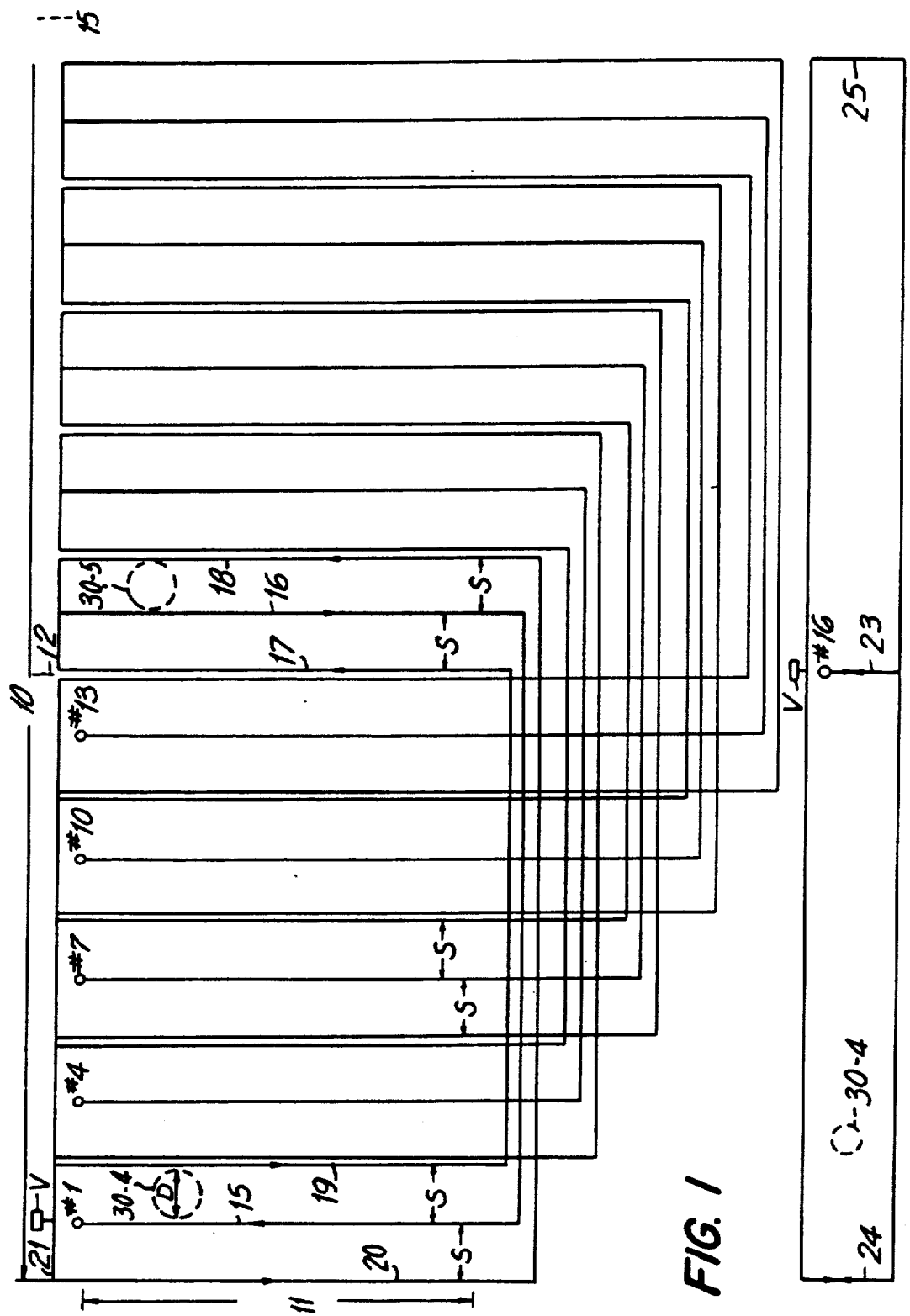
FIG. 1 is a schematic view of part of the electrode pattern for a digitizer tablet in accordance with the invention.

With reference to FIG. 1, considering only one coordinate, say, the X coordinate, the tablet has an active area defined by reference numerals 10 in the X-direction and 11 along the Y-direction. Within that active area are located vertical wire portions made up, for this instance, of 16 independent, selectively activatable wires, numbered #1–#16, which are distributed symmetrically throughout the active area in the following manner. Fifteen of the wires, #1–#15, are identical, the sixteenth, #16, is different. Each of the #1–#15 wires comprises a W configuration folded into a U to form two conductor sections, with the left leg or section of the U on the left side of the tablet center (indicated schematically by the vertical dashed line 12), called herein the left tablet segment, and the right leg or section of the U on the right side of the tablet center 12, called herein the right tablet segment.

Each wire comprises in the left segment a middle portion 15 connected to a terminal indicated by a circle and the wire number. The wire portion 15, which forms a first active portion, extends vertically downward in the active area, crosses over to the right segment (all horizontal crossings are outside the active area), and reverses direction, now extending upward to form a second active portion, shown at 16. The portion 16 now splits into third and fourth outer active wire portions 17 and 18 extending in the downward direction, crosses back to the left segment, and now respectively extend upward as fifth and sixth active portions 19 and 20 to a common node or point 21. The common point 21 is connected to a current source V, e.g., of +5 volts.

For convenience, the following notation will be used. 15(#1) will refer to the middle wire 15 in the left segment for wire #1; 19(#1) will designate the return outer wire on its right, and 20(#1) the return outer wire on its left. Similarly, 16(#1) is the middle wire portion in the right segment, and 18(#1) and 17(#1) the adjacent outer wire portions of the #1 wire.

Figure 2:
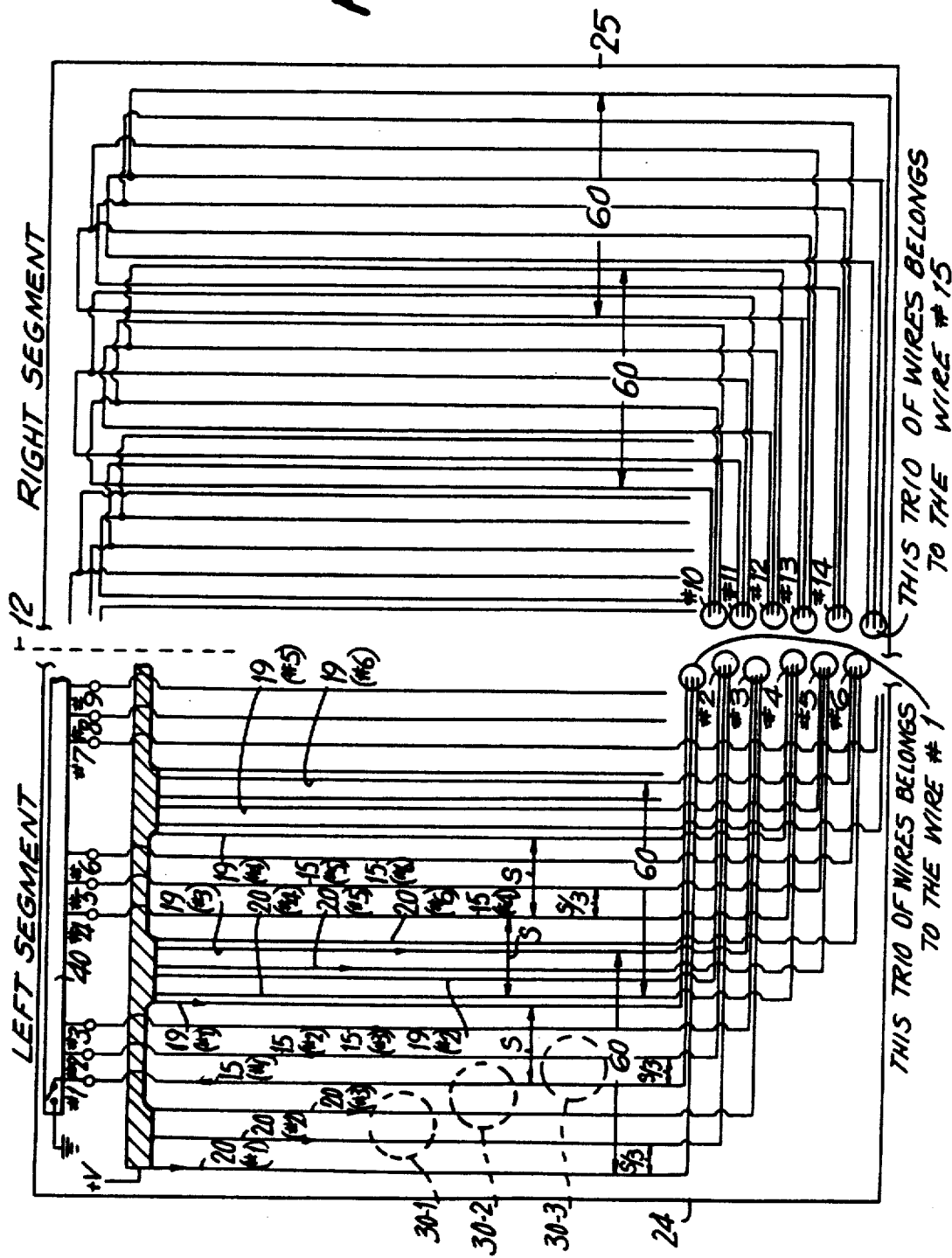
FIG. 2 is a view similar to FIG. 1 of a different part of the same tablet.

FIG. 1 shows the layout for a first set of non-overlapping wires, numbered #s (1, 4, 7, 10, 13). There are two other sets each of non-overlapping wires, not shown in FIG. 1. The second set comprises the wire #s (2, 5, 8, 11, 14); the third set contains wire #s (3, 6, 9, 12, 15). The three sets are, so-to-speak, symmetrically interlaced to define thirty coarse positions in each segment. This is best illustrated in FIG. 2, which is an expanded view of parts of wire #s 1–9 in the left segment and #s 10–15 in the right segment. For present purposes of explanation, the tablet active area (for the X coordinate) can be thought of as beginning somewhere to the right of wire 20(#1). With the layout shown in FIG. 2, expanded to show all fifteen wires, sixty coarse positions can be identified, which will be better understood with reference to FIGS. 3 and 4.

Figure 3:
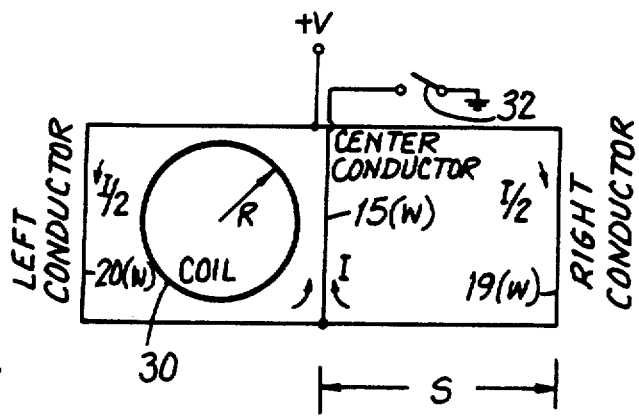
FIG. 3 is a schematic view of one conductor to illustrate operation of the invention.
Figure 4:
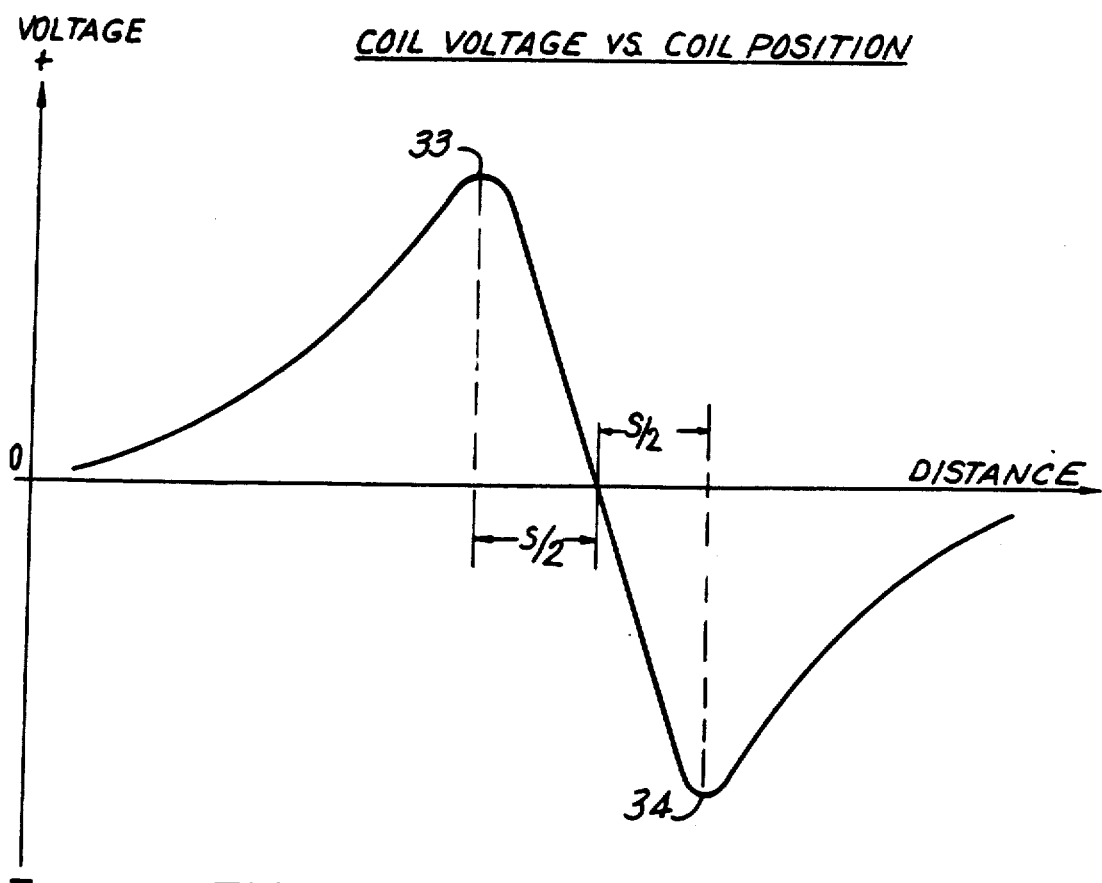
FIG. 4 shows the signal induced in a coil as a function its relation to the conductor configuration of FIG. 3.

FIG. 3 illustrates a single W wire configuration, with a middle wire 15(w), a right wire 19(w) and a left wire 20(w). The left and right wires 19(w), 20(w) are spaced the same distance S from the common middle wire 15(w). A voltage source V is connected to the outer wires, and the center wire is connected to ground as a sink via a switch 32. Suppose now that switch 32 is closed for successive short periods of time, and during each interval, a coil 30 is moved horizontally across the W wire. FIG. 4 shows a plot of the voltage induced in the coil 30 as a function of its horizontal position relative to the W. It will be observed that a positive peak voltage or MAX(+) 33 is obtained when the center of coil 30 is located midway between the left 2O(w) and middle 15(w) conductors, that is, the distance S/2 from the center conductor. Similarly, due to the reversed field direction, a negative peak voltage or MAX(−) 34 is obtained when the center of coil 30 is located midway between the middle 15(w) and right 19(w) conductors, again spaced the same distance S/2 from the center conductor. We can thus define two MAXs or two coarse positions associated with each W configuration of a wire.

The explanation given above to demonstrate how positive and negative voltages are generated depending upon whether the coil is located respectively over the left and right halves of the W configuration in, say, the left segment, will apply equally to the W configuration of the same numbered wire in the right segment except that the polarities are reversed. In other words, looking at wire #1 in FIG. 1, when the coil is midway between conductors 20 and 15 in the left segment a positive polarity peak voltage is then generated; when the coil is midway between conductors 17 and 16 in the right segment, due to the opposite current directions, a negative polarity peak voltage will be generated. Hence, in the left segment, for each numbered wire, an induced positive peak indicates a coarse location to the left of the middle conductor of the W, and in the right segment, an induced negative peak indicates a location to the right of the middle conductor of the W. Since each numbered wire provides a W portion in the left segment and a W portion in the right segment, four coarse positions are associated with each of #s 1-15 wires, which is how one arrives at sixty coarse positions. Note also from FIG. 4 that a zero voltage is induced in the coil 30 when it is centered exactly over the middle conductor.

Returning now to FIG. 2, it will be observed that there are two additional numbered wires #2 and #3 whose middle conductors are located between the middle conductor 15(#1) of the #1 wire and its right conductor 19(#1). From the previous explanation, it will be seen that the dashed-line circle referenced 30-1 shows a coil in the left midway position for the #1 wire corresponding to the coil 30 position in FIG. 3. Coil position 30-2 is the left midway position for the #2 wire, and circle 30-3 is the left midway position for the #3 wire. By analogous reasoning, there will be right midway positions for the #1, #2, and #3 wires in the left segment that will be equally spaced to the right from the coil position 30-3.

Summarizing, the pointing device is an inductive coil with a diameter D roughly equal to, preferably slightly smaller than, the spacing between adjacent active wire portions of each numbered wire. See the dashed circle designated 30-4 in FIG. 1. Each numbered wire is separately activated in turn. In the position of coil 30-4 shown in FIG. 1, a maximum signal voltage of one polarity will be induced in the coil when a signal is applied to the selected activated wire, because the current in wire portion 15(#1) will flow in opposition to that flowing in 19(#1). When coil 30 is moved to the left midway between wire portions 15(#1) and 20(#11), a maximum signal of the opposite polarity is induced in coil 30, again because of opposite current flows in the wire portions adjacent opposite coil sides. Arrows have been provided for the #1 wire to show the opposite current flows. When the coil is positioned with its center exactly over the middle wire 15(#1), a minimum (ideally zero) voltage will be induced in the coil 30. Thus, as the device coil 30 moves between the three positions described, when wire #1 is activated, the induced signal voltage varies from a maximum at one polarity to a minimum (zero) and then to a maximum of the opposite polarity, as indicated in FIG. 4. It is possible within the scope of this invention to detect and distinguish the positive and negative MAXs, thereby enabling two coarse positions per wire to be determined in the left segment. By similar reasoning, it will be apparent that when the device coil 30-5 is located in the right segment, over the space between 16(#1) and 18(#1), shown at 30-1, or moved to the left between 16(#1) and 17(#1), again positive and negative polarity MAX signals will respectively be generated when wire #1 is activated. Hence, assuming one can determine whether the device coil 30 is in the left or the right tablet segment, a total of four coarse positions would be defined by wire #1. With fifteen wires similar to #1 present, a total of 60 coarse positions would be defined, provided that polarity as well as MAX were employed as the identifying key.

The last independent wire #16, as will be noted from FIG. 1, comprises a single large W, with a middle wire conductor 23 extending vertically, which splits into a left vertical conductor 24 and a right vertical conductor 25 (off the drawing to the right), which return to a common terminal of a current source. The middle wire 23 (#16) is located at the exact center 12 of the tablet within the active area (shown below in FIG. 1 for simplicity). The left vertical portion 24 (#16) lies adjacent the vertical portion 20(#1) at the left edge of the active area. The right vertical portion 25(#16) lies adjacent the vertical wire portion at the right edge of the active area, which in this instance would be 18(#15) (not shown).

In operation of the system, +5 volts is applied to the terminals labelled V. Then, a multiplexer 40 (FIG. 2) connects each numbered wire terminal in sequence to a reference potential, such as ground, for a short time interval. Detecting circuits are connected to the pointing device coil 30. A signal waveform is induced in the cursor coil during the resultant wire grid pulsing. The magnitude and polarity of the largest value of signal voltage is determined for each numbered wire in turn and stored.

FIG. 5 shows the basic circuit, simplified for a single wire W. A microcontroller 50 controls the scanning of the wires and voltage measurements. As shown, an enable pulse corresponding to the action of multiplexer 32 activates the wire. A typical pulse is shown in FIG. 6. The wire to wire scanning or sampling time is, for example, 100 microseconds, equivalent to a scan frequency of 10 kHz. These values are not critical. A sine wave voltage signal is induced in the coil 30. The frequency will depend upon the coil inductance and other circuit parameters, typically a resonating capacitor. As an example, which is not limiting, for a 12 inch tablet, with a wire spacing S equal to about 0.630 inches, and a coil diameter D equal to about 0.6 inches, the circuit will resonate in the vicinity of about 200 kHz. FIG. 7 shows the induced signal voltage in the coil 30 after it has been amplified and passed through a band-pass filter 51, at the node A. The coil signal is a damped oscillation, having positive and negative peaks. A dual sample and hold (S/H) circuit 52 is provided, activated by the microcontroller as shown. The result is that the S/H circuit 52 samples and holds the first positive peak, as shown in FIG. 8, and next samples and holds the second negative peak indicated at FIG. 9. The results are processed in the microcontroller 50 through a conventional A/D converter (not shown), and the digital values stored in memory 53. Each of the numbered wires are similarly scanned in succession and the coil voltages processed in a similar manner. The circuitry of the amplifier and bandpass filter block 51 and the dual S/H block 52 is straightforward and conventional and requires no further elaboration for those skilled in this art. The filter characteristics are chosen to pass the desired oscillatory signal and reject other frequencies to improve the signal to noise ratio. Similarly, programming of the microcontroller 50 to perform the functions described above will be obvious to those skilled in this art.

The cursor coil diameter, represented by D in FIG. 1, should be no greater than the spacing S between adjacent active wire portions of each numbered wire, and preferably slightly smaller. The purpose is to maximize the induced voltage when the coil is located exactly midway over the space between adjacent wire portions of the same numbered wire.

When wire #16 is scanned, it too will induce a signal voltage in the coil 30. Similarly to the description given above for wire #1, when the coil (see 30-4 in FIG. 1) is over the left segment, due to the direction of the arrowed current flow in active wire portions 23 and 24, a voltage of one polarity is induced in coil 30-4. When the coil 30-4 is over the right segment, a signal voltage of the opposite polarity is induced in coil 30-4. It will be further understood that if by chance the coil center is precisely over the center wire portion 23, then, ideally, no signal voltage is induced in the coil. However, due to practical constraints in constructing a perfect wire #16, the latter situation will hardly ever occur. Hence, signal polarity of the voltage associated with wire #16 is used as the key to unambiguously determine whether the MAX (magnitude) signal associated with any of wire #s 1-15 is from its left segment or right segment portion.

The determination of coarse position therefore requires a determination of which of #s 1-15 wires, when activated, induced a MAX signal in the device coil, the polarity of the MAX signal, and a determination of the polarity of the signal induced in the #16 wire. These three items of information enable a determination of 1 of 60 possible coarse positions. While, in principle, a single scan of the #1-16 wires, and collection and storage of the induced signals (magnitude and polarity for #s 1-15; polarity for #16) from the coil is all the information needed to make a coarse position determination, in actual practice, since the scanning rate is typically thousands of times per second, e.g., 10 kHz, it is readily possible to carry out multiple scans of the same device position before the user will be able to move the device. This would allow a number of determinations to be made, and for averaging to be used, typically done in software, to improve the accuracy. This averaging process is common in commercial tablets.

Determination of the coarse position can then be made in a number of different ways. One simple way is, using known software or hardware, by converting each analog signal into its digital equivalent, and then processing the digital signals through a known MAX detector circuit, or, by software, determining the positive and negative MAXs, and storing these in arrays indexed by wire number. Now, means are provided to map the wire number to the coarse position. Again, there are many ways to do this. One simple way, illustrated in FIG. 10, is to create four arrays each indexed by wire number and named, for simplicity, $POS_{13}LEFT$, $NEG_{13}LEFT$, $POS_{13}RIGHT$, and $NEG_{13}RIGHT$. In each array, each memory location contains one of fifteen positions as indicated for the corresponding wire number indices 1..15. In operation, by software or by hardware, if the wire #16 signal is, say, positive, meaning the coil is over the left segment, and the MAX signal obtained is positive, then the $POS_{13}LEFT$ array is used to determine the coarse position from the identification of which wire number has the MAX signal. When the MAX signal is negative, the $NEG_{13}LEFT$ array is used to determine the coarse position, again using the wire number as the key to access the array. When wire #16 signal is negative, then the $POS_{13}RIGHT$ and $NEG_{13}RIGHT$ arrays are used to determine the coarse position. It would be obvious how to implement the above determination in many other ways to perform the same function, which is to determine by signal magnitude and polarity which side of position-locating wires #1-15 the pointing device is closest to, and to determine by signal polarity from the segment-locating wire #16 which segment the pointing device is over.

Once the coarse position (1 of 60 consecutive positions) is determined, then to more accurately locate the pointing device, commonly called determining its fine position, within the selected coarse position, linear interpolation between positions on each side of the determined coarse position is used. No additional scanning is necessary. The scheme used, as such, is straightforward, and is most conveniently carried out by software. Again, many ways are available to accomplish this. One simple way is as follows. Subtract the stored digital values for the adjacent wires to the left and right from that associated with MAX, and the fine position then becomes difference 1/(difference 1+ difference 2) * counts per wire spacing, where difference 1 is the difference between the stored values for the MAX wire and the previous wire, and difference 2 is the difference between the stored values for the MAX wire and the next wire. Counts is a derivation from the earlier tablet technology (exemplified by the Kamm patent), wherein a clock pulse counter is started when the sequential scan begins, and a stop pulse is generated when the travelling wave crosses under the pointing device, the counter sum (count) or raw data represents the absolute position of the pointing device with respect to the origin of the X-Y coordinate system. Thus, count is the equivalent of device position in the present invention. Similarly, a count value can be made representative of each coarse position in the present invention. Thus, if we assume, for simple calculation purposes, a total count of 6000 for the furthestmost device position, each of the 60 coarse positions is represented by an increment count of 100, the second a count of 200, the third a count of 300, and so on until the last Which would have a count of 6000. Thus, the count increment or spacing for this representation is equal to 100.

To illustrate determination of absolute position, assume the coarse position wire has been determined to be #7, position 13, in the left segment, whose position represented by count is 1300. The positive stored signal digital value (assume an 8 bit A/D converter providing 256 values) for the #7 wire is 210. One then looks into the signal array for the stored positive digital values for wires #6 and #8, previous and next wires. Suppose the positive value for #6 is 150 and that for #8 is 40. The device coil would then be closer to the #6 than to the #8 wire. Assuming N represents the wire number associated with MAX, the fine position would be:

$$[MAX(N) - signal(N-1)]/ ([MAX(N) - signal(N-1)] +$$

$$[MAX(N) - signal(N+1)] * \text{count per wire (increment)}.$$

For the instance given, the fine position is $$(210-150)/[(210-150)+(210-40)] * 100 = 0.2609 * 100 = 26 \text{ counts}.$$

Absolute position from the origin equals coarse position plus fine position. Again, using the count analog approach for the example above, the coarse count for #7 wire is 1300. Thus, absolute position is 1300+26=1326 counts. For a 12 inch tablet span, covering the range of 6000 counts, each count corresponds to 12 inches/6000=0.002 inches or 2 mils. Thus, for the example above, the center of the pointing device coil is located 1326 * 0.002 or 2.652 inches from the origin of the X-coordinate axis.

Figure 11A:
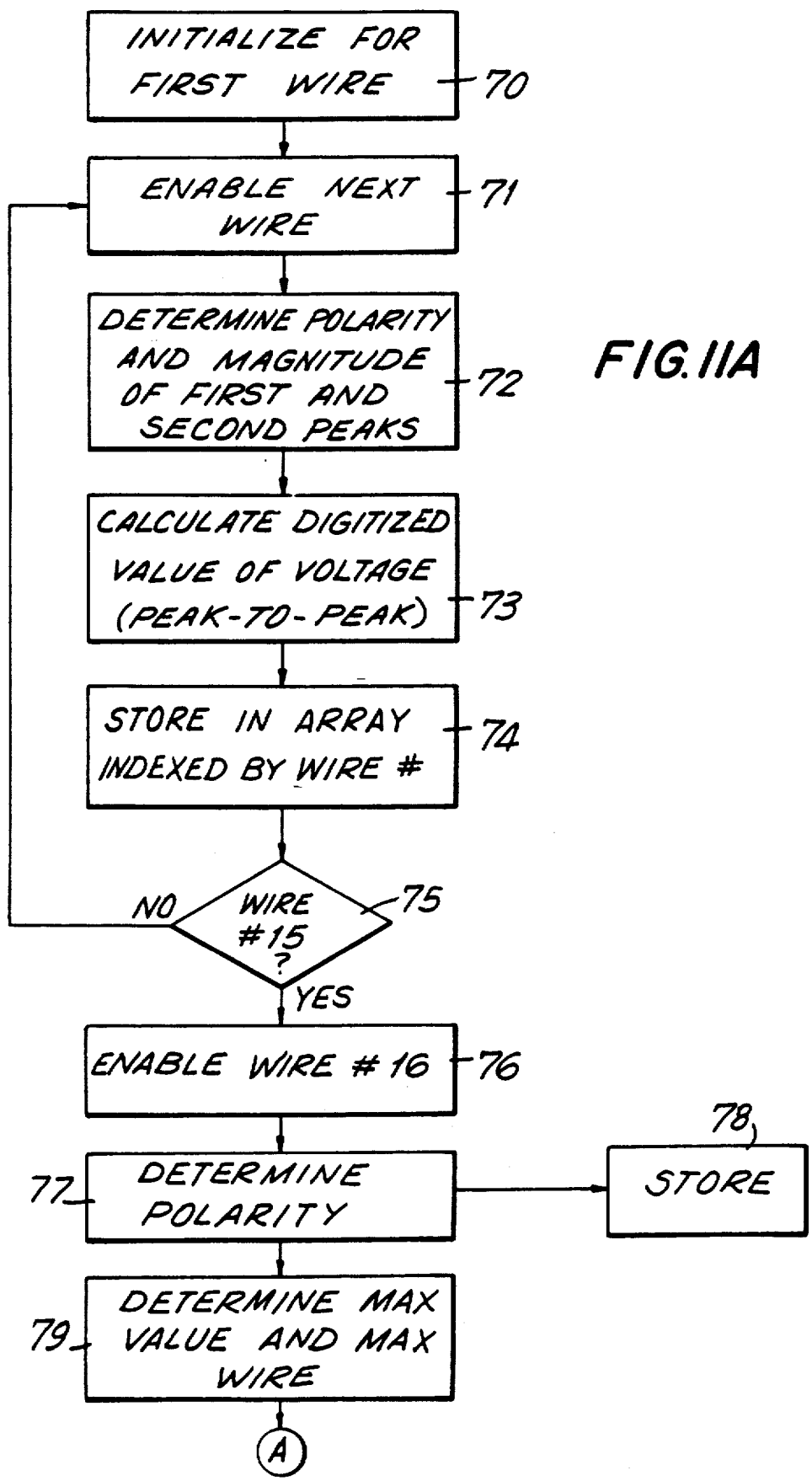
FIGS. 11A and 11B are flow charts showing how the coarse and fine positions are determined for a tablet according to the previous figures.
Figure 11B:
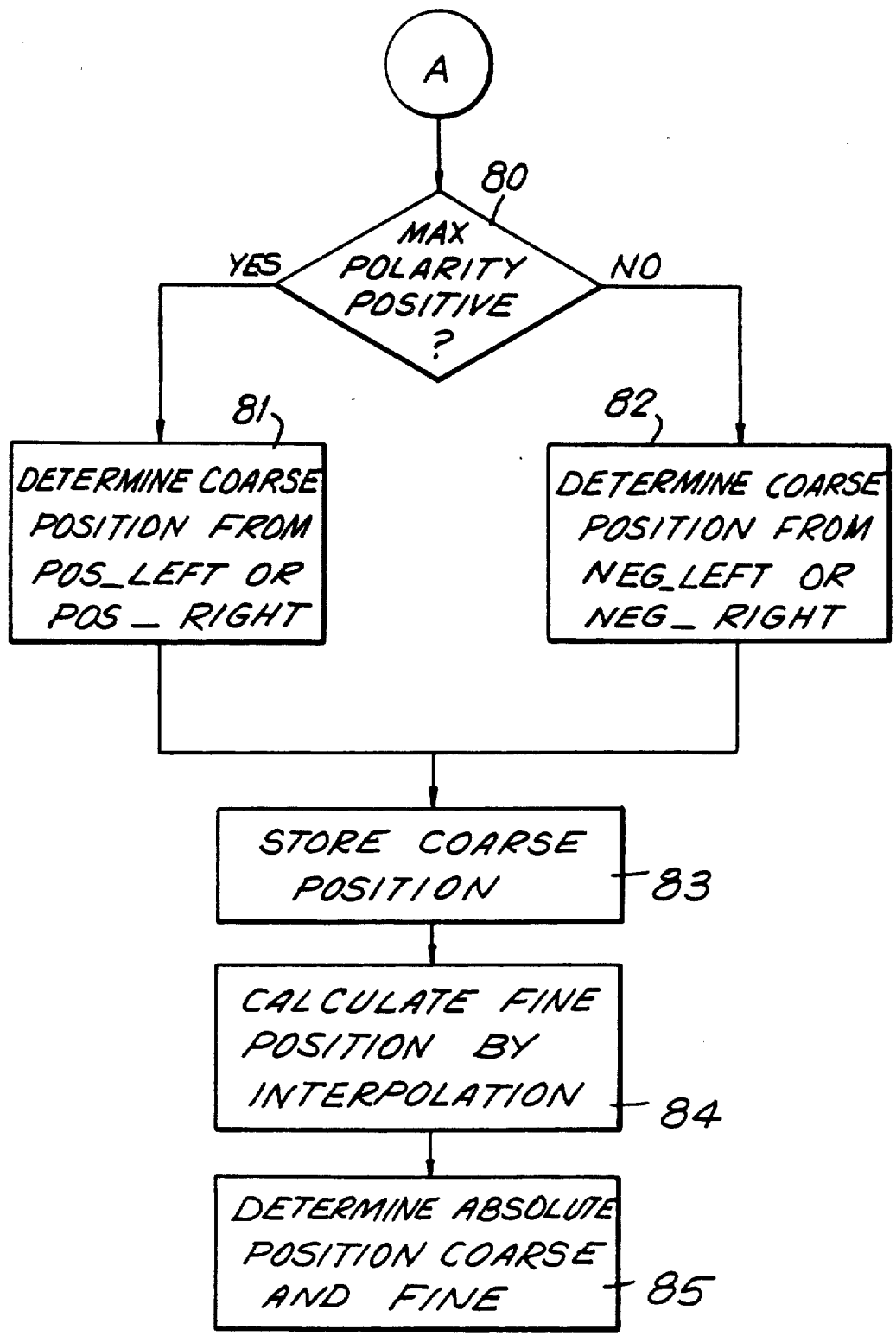

FIG. 11 shows a flow chart schematically illustrating the algorithm followed by the microcontroller 50 in operating the circuitry schematically illustrated in FIG. 5. In the first block 70, the system is initialized in preparation for exciting the individual conductors. The next or first conductor (#1) is then pulsed 71, the coil signal processed and its first and second peaks measured 72. The smaller peak value is subtracted from the larger peak value 73 (being of opposite polarity amounts to summing the peaks) and this absolute peak-to-peak value and its first peak polarity stored 74 in an array indexed by wire number. This step is not essential but is preferred. If the DC level of the coil signal were known, then measuring the first peak would be sufficient. However, the DC level can drift. Sampling the second peak and subtracting that opposite value from that of the first peak yields a peak-to-peak value independent of the DC level. An added benefit from this step is increased A/D resolution. A test 75 is then run to determine if all of the 15 wires have been excited. If not, the preceding steps are repeated for each of the wires numbered #2–#15. When the test is satisfied, wire #16 is pulsed 76 and the polarity of the induced coil signal determined 77 and stored 78.

The stored magnitudes in the array can then be processed 79 to determine the MAX value. Actually, this would be a continuous process as each value is generated and compared to the last MAX, which is a standard MAX routine. The MAX value determines the closest numbered wire to the pointing device coil.

To determine coarse position (1 of 60), the arrays or tables of FIG. 10 are employed. Which set of arrays is used is determined by the stored polarity of the MAX signal 80. Which of the remaining two tables is used is determined by the stored polarity of the signal generated by wire #16, using the MAX wire number to index 81 into the arrays at the left of FIG. 10 or to index 82 into the arrays at the right of FIG. 10. This produces a coarse position which is stored 83. The fine position is then calculated 84 using, as described above, the ratio of the difference between the magnitudes of the MAX signal with that of the previous wire to the sum of the differences between the MAX signal with that of the previous and next wires. Absolute position is then determined 85 by summing the coarse and fine values.

The invention is not limited to the specific layout in which each tablet portion, indicated in FIG. 2 by reference numeral 60, is covered, effectively, by three Ws, with each tablet portion 60 overlapping the adjacent tablet portion 60 to provide six coarse positions per tablet portion 60. Thus, two or more Ws can be located in each tablet portion, depending upon the wire density desired. Similarly, instead of one W portion in a left segment and one W portion in a right segment, resulting from a U fold of the W, each W can be shaped like an S, to form W portions in each of four spaced segments of the tablet. In the latter case, the single segment-identifying wire #16 would be insufficient. It would have to be replaced with a new wire #16 covering the left tablet half, to determine which of the two segments on the left the cursor coil is over, and a new wire #17 covering the for the two segments on the right.

It will also be observed that the wire arrangements are in an ordered sequence, with wire terminal numbers #1..#15 in left-to-right order in the left segment, and their corresponding W sections in the right segment in the same left-to-right order. Though preferred, this is not essential to the invention. The arrays or look-up tables of FIG. 10 map wire number MAXs and polarity to coarse positions. Hence, the sequence in the right segment can be scrambledor ordered differently from that in the left segment, and satisfactory results obtained by simply modifying the mapping in the arrays.

Moreover, it will be clear that the scanning order of the wires is not important, so long as the induced signals are correctly associated with the wire actually activated at that instant. In other words, the technology of the present invention does not require, as in the Kamm patent, a travelling wave. What is being done is, simply, to pass a current, in any order, through each of the wires, measure the polarity and magnitude of the induced voltages, determine the wire number for the MAX signal, and then determine, depending upon whether the MAX is positive or negative, from auxiliary means (such as coil #16) from which tablet segment the MAX signal was derived. There are no time-dependent measurements involved. Absolute coil coarse position is always obtained because it is associated solely with the positions of the W sections, and fine position then determined by interpolation between adjacent W sections. The electronics circuitry required is much simpler than that associated with known tablets, which utilize a travelling wave and phase detection to locate the cursor. Moreover, the switching circuitry is simplified. In the instance given, using 16 wires, a relatively inexpensive $1 \times 16$ MUX can be located between the enable output port of the microcontroller 50 and the #1..16 terminals. The amplifier and bandpass filter are straightforward. The bandpass filter essentially passes the signal induced in the coil through to the S/H circuits, while rejecting noise and other extraneous signals at different frequencies.

It will also be observed that the first coarse position in FIG. 2 is located at the center of the coil 30-1. Determining fine position by interpolation requires count values on both sides of the MAX. This can be accomplished by providing additional wires to the left of conductor 20(#1), or by measuring the active area from, say, the center of coil 30-2. The wire spacing would then be adjusted to cover the full active area plus the extra wires at the ends to provide good interpolation. This compensation for end effects is again common in the known tablets.

It will also be observed from FIG. 2 that the wire arrangement is symmetrical, starting from the left side, for the first six wires, spaced S/3 apart, then three sets of two closely-spaced wires are encountered, then three wires spaced S/3 apart, and so on. The layout in FIG. 2 is not to scale, but in actual practice, the spacing S between the middle and left and right conductors of each W portion would be maintained the same. The close spacing of the wires where shown has no significance, since each W is activated separately. It is preferred that the closely-spaced wires not overlap because of the difficulty then of balancing the currents in each leg of the W.

While the description given is for determining the location of the cursor with respect to one coordinate of the tablet, say the X-axis, it will be understood that an identical set of wires extending orthogonally to those shown in FIG. 2 would be provided for determining the cursor location along a second coordinate of the system, namely, the Y-axis. The set of X-wires and the set of Y-wires can be activated in sequence by the same circuitry, and the corresponding Y values processed and stored in memory to determine the Y-coordinate.

In the description so far given of a preferred embodiment of the invention, the grid conductors are driven by connecting each of them in turn via MUXs to a pulse source, and the output voltages are taken from the pointing device and correlated to the activated conductor number. The reverse mode of operation is also within the scope of our invention. In this reverse mode, the pointing device coil is driven with a series of electrical pulses and the grid conductors scanned in turn by connecting a common signal detector via MUXs to each of the conductors in turn. After suitable processing, one obtains a plurality of digital values representing the magnitude and polarity of the voltages induced in each conductor by the electromagnetic wave from the pulsed coil. The same processing can be employed to determine coarse and fine positions as described in connection with the preferred grid-driven embodiment.

It will also be observed that in the electrode array of the invention, each individual conductor is characterized by n equally spaced parallel active portions, where n is an integer at least equal to 3. When the individual conductor has one section, then n=3; when the conductor has two sections, as in the preferred embodiment, n=6; when the conductor is bent to form an S with three sections, n=9. In each instance, when the individual conductor is scanned or excited, the current simultaneously flows through all the parallel portions, and in each section the current flow in the middle portion is in the opposite direction to that of the flanking outer portions and is integer related in magnitude. Thus, the current in the middle portions to that of the outer portions is in the ratio of 2:1. The total number of individual conductors thus needed to provide comparable accuracy with commercial tablets is approximately one-fourth (16 as L against 64). In addition, the phase detection circuitry and counters and much of the logic circuitry is eliminated in the digitizer system of the invention. The savings in components is thus evident.

For the layout shown in FIG. 2 for any three overlapping conductor sections, such as #s 1, 2, 3 or #s 4, 5, 6 or #s 7, 8, 9 in the left tablet segment, over a pitch distance equal to 60, six consecutive coarse positions will exist, the maximums of which will occur first on the left sides of the overlapped Ws and then on their right sides. Thus, for example, for conductor #s 4, 5, 6, the six coarse positions, in consecutive order, are determined by three positive MAXs at the left sides of conductors #15(#4), 15(#5), and 15(#6), respectively, and then three negative MAXs at the right sides of 15(#4), 15(#5), and 15(#6), each of the coarse positions being spaced S/3 units apart.

While this layout is preferred for an average-sized tablet, as it provides reasonable conductor spacings and reasonable conductor line widths, the invention is not limited thereto. Since each numbered conductor is separately excited, and the inductive coil diameter is related to the conductor spacing of each individual conductor, more than three or less than three interleaved conductors can also be used.

It will also be observed that in the preferred arrangement the outer conductors 17, 18 and 19, 20 are connected in common to the voltage source, and the middle conductor 15, 16 of each individual wire is selectively switched to ground. The invention is not limited to this arrangement, and the middle conductors can be connected in common and the voltage or current source V selectively switched via a MUX. One reason for preferring the illustrated layout is that it lends itself to a further improvement of the system related to balancing of the currents in the split conductor portions. It is desirable that, whatever value of current flows in the middle conductor of the W, substantially one-half of that value will flow in each of the outer conductors. This results in signals that will vary substantially linearly among adjacent numbered conductors, thereby improving the accuracy of the interpolation scheme employed. This result is achieved by making the conductor runs of the outer conductors of substantially equal resistance. Another approach is to provide, connected to each outer conductor, an external resistor whose resistance value is substantially greater than that of the conductor runs. Hence, differences in the conductance of the runs will have little effect on the current flow. This has the undesired result of voltage and power losses across such resistors.

Figure 12:
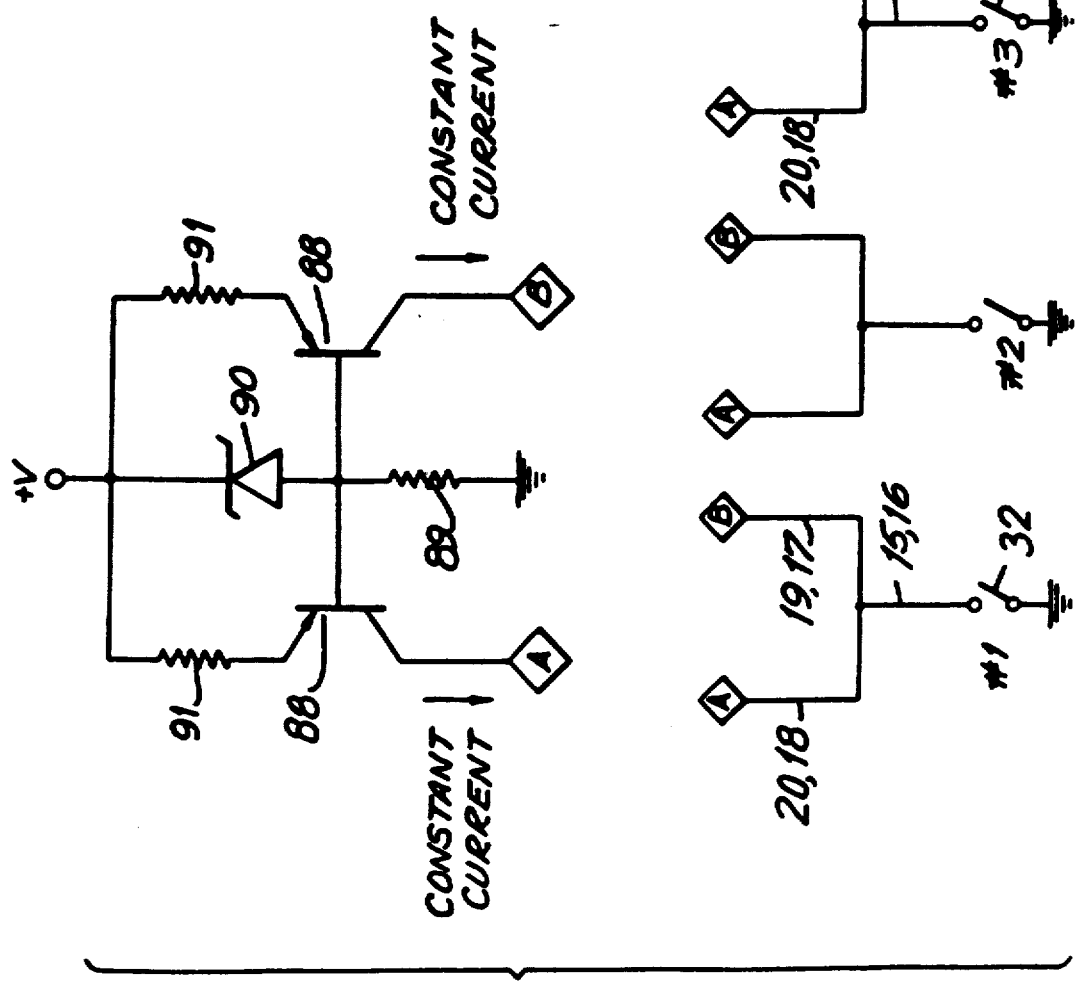
FIG. 12 is a schematic showing a preferred constant current source for supplying excitation current for the electrode conductors.

A better solution in accordance with this aspect of the invention is to provide a constant current source in series with each of the outer conductors. This achieves the same result of substantially equal current flow and reduces the penalties indicated above. FIG. 12 shows one form of the basic circuit for wires implemented as a constant current source pair that feeds all the W's for the entire grid. In this case, the outer conductors 20, 18; 19, 17; and 24, 25 terminate in separate terminals A,B. The #1, #2, #3 and #16 wires are shown. The remainder will be similar. The constant current source, connected to the current source V, comprises a pair of PNP transistors 88, whose bases are commonly connected via a small-valued resistor 89 to ground, and via a Zener diode 90 to the current source. The transistor emitters are each connected via small-valued resistors of equal value 91 to the current source V. This arrangement clamps the emitter-base voltage to the Zener breakdown voltage, forcing the same collector current in both transistors. Each collector is respectively connected as shown by the lettered terminals to all of the A and all of the B terminals. Thus, as each switch 32 is closed, simulating the MUX action, substantially the same current will flow in each of the outer conductors and thus double the current flow in the middle conductor of the W. It will be evident that the invention is not limited to this particular constant current source for feeding the W wires of the electrode array. In view of this relatively simple and inexpensive addition to balance the current flow in the split wires, the grid-driven embodiment as illustrated is preferred. It would be more difficult to devise a scheme to balance the currents in the wires in the cursor-driven embodiment.

Figure 13A:
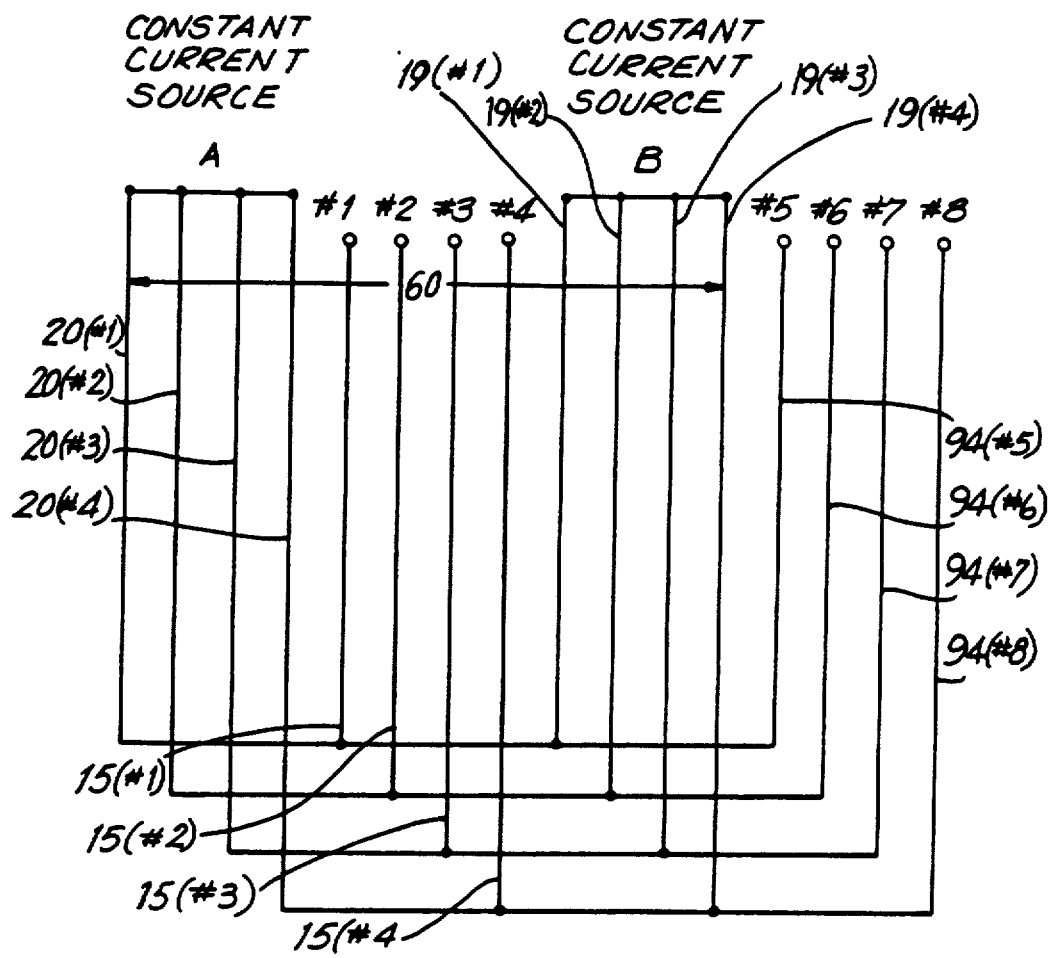
FIGS. 13A and 13B show respectively the layout and current flow for a first modification.
Figure 13B:
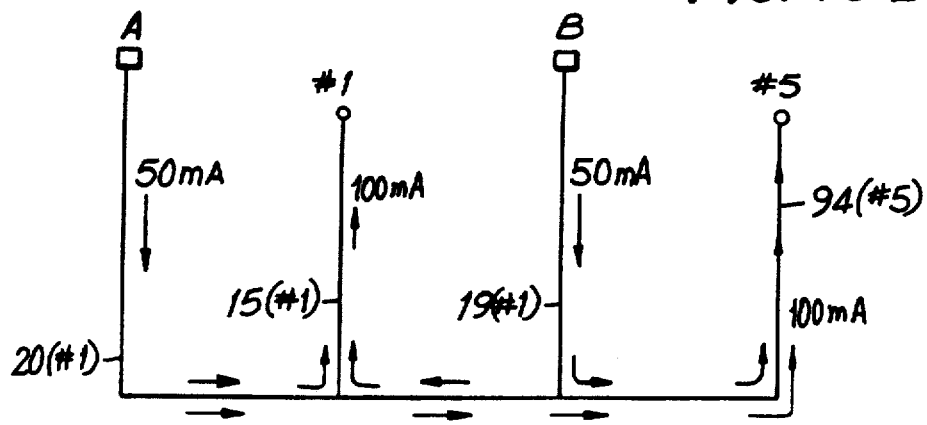

While the 3-leg W configuration is the preferred layout in accordance with the invention, the principle thereof can also be realized in a 4-leg W arrangement. This is illustrated in FIGS. 13A and 13B. FIG. 13A shows the layout for one section for eight individually-excited wires, #s 1..8. In this case, the pitch distance 60 occupied by three wires in the FIG. 2 embodiment is occupied by four wires in FIG. 13A. The same notation is used in both figures, so the similarities will be clear. Each of the wires #s 1-4 will have a left MAX midway between conductors 15 and 20, and an opposite polarity right MAX midway between conductors 15 and 19, thus defining eight coarse positions in the pitch distance 60. In addition, one extra active conductor is also connected to the common node of the left 20 and right 19 wires for each of wire #s 1-4. Thus, wire #5 has an active portion 94(#5) connected to the wire #1 splitting node, wire #6 an active portion 94(#6) connected to the wire #2 splitting node, and so on. This extra conductor 94, which converts the W from 3-legged to 4-legged, however, only produces one MAX midway between it and the adjacent leg of the W to which it is connected, which is wire #19, thereby adding one additional coarse position for each of wire #s 5-8.

As in the FIG. 12 embodiment, the split conductors are connected to a constant current source at terminals A and B, and the individually numbered wires #s 1..8 would be connected via a MUX to a suitable sink.

The operation is similar to that described in the other embodiments and will be clearer from FIG. 13B which shows just one of the resultant 4-legged Ws combining wire #s 1 and 4. Assuming each of the constant current sources connected to terminals A and B are capable of supplying a current of 50 mA, when terminal #1 is grounded, the 50 mA supplied by each of the current sources will flow as shown down each of conductors 20(#1) and 19(#1) and which will sum to 100 mA through the common return conductor 15(#1), thus defining a MAX(+) to the left of wire 15(#1) and a MAX(−) to the right of wire 15(#1). When at a later time in the cycle with #1 floating, wire #5 is grounded, again 50 mA currents will flow along conductors 20(#1) and 19(#1) and sum to 100 mA in conductor 94(#5). This will define a MAX(+) midway between Wires portions 19(#1) and 94(#5), and a much smaller induced positive polarity voltage midway between wire portions 20(#1) and 94(#5). The latter will additively contribute to the induced voltage in the coil. Thus, a MAX(+) recorded when wire #5 is excited indicates a coarse position to the left of its active portion 94(#5). This concept offers the advantage of reduced interconnects for a given number of coarse positions, but may not possess the efficiency of the 3-legged W configuration.

Figure 14:
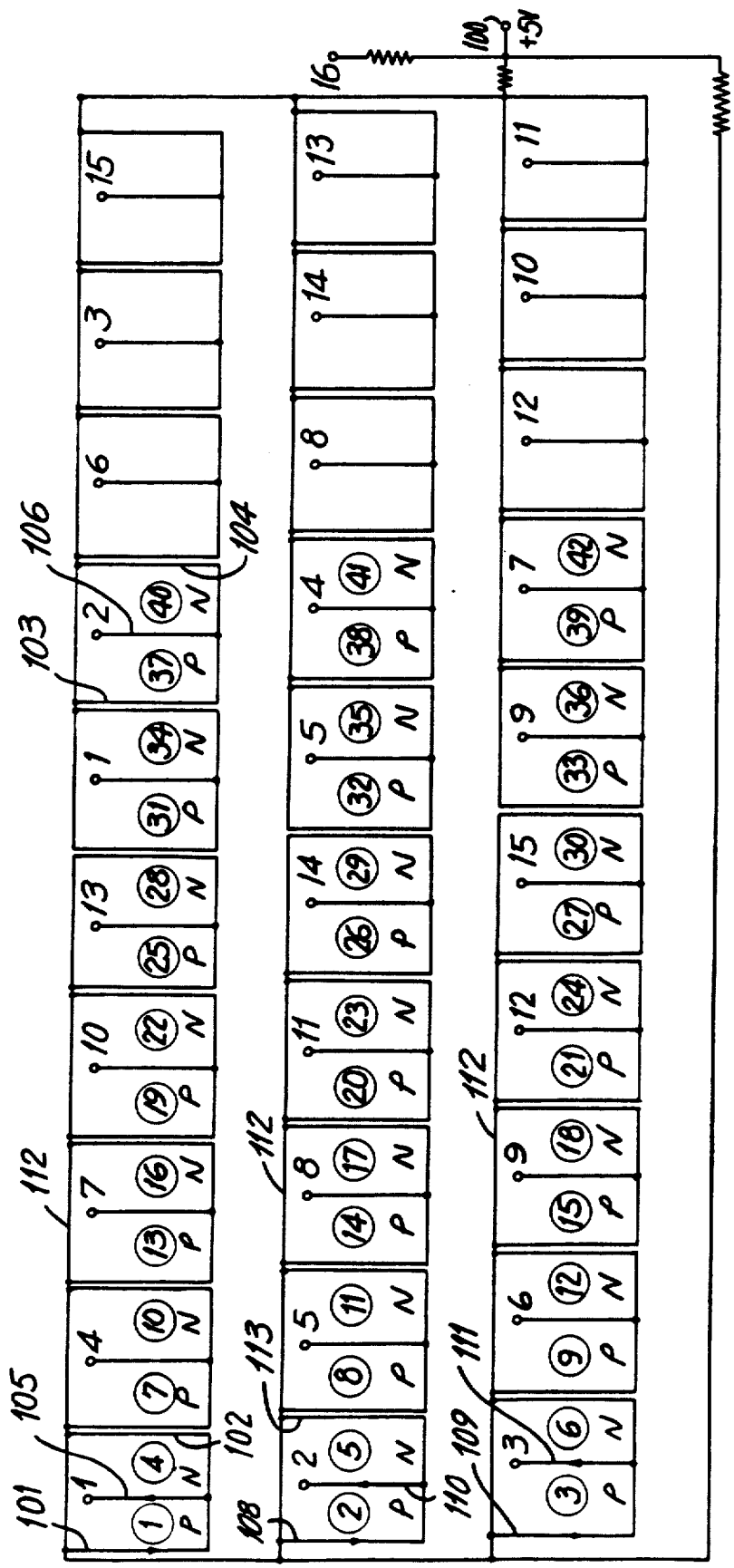
FIG. 14 shows the layout for a second modification which avoids the need for auxiliary windings.

FIG. 14 shows a modified layout of the W-configured wires which avoids the need for additional auxiliary conductors to distinguish the left and right tablet segments. To avoid drawing clutter and ease understanding, the various wires have been shown laidout in three different rows, but it will be understood that the three rows would actually fully overlap with the active vertical portions as indicated being interleaved and occupying in the actual overlapped arrangement the horizontal positions shown in the drawing. Each same numbered terminal would be electrically connected together (not shown in FIG. 14) to one terminal of a 16×1 MUX (there are terminals numbered 1..15), with the single output connected to ground. As a result, each W on the left hand side becomes connected to a W on the right hand side. Hence, when the two "1" terminals are simultaneously grounded, a current will flow from the positive voltage source 100 down the outer conductors 101, 102 in the left segment and simultaneously down the conductors 103, 104 in the right segment. The respective outer conductor currents will combine in the respective common middle conductors 105, 106. As with the FIG. 1 embodiment, a coarse position is defined between each middle conductor and its left and right outer conductors. Hence, a coil on a cursor located over each winding half would register a positive polarity MAX to the left of the middle conductor 105, 106 and a negative polarity MAX to the right of the middle conductor. As mentioned, the Ws in the row beneath the top row would be overlapped so that the conductors 108, 109 to the left of their respective middle conductor 110, 111 would actually lie between the left conductor 100 and the center conductor 105. The result is that a sequence of vertically-oriented conductors would be formed in a single plane and would constitute the active region of the tablet. For instance, the first seven conductors would be 100, 108, 109, 105, 110, 111, 102 . . . in that order. The coarse positions are indicated by circled numbers 1–42. The remaining 18 of the total of 60 coarse positions have not been indicated.

It will be evident from the foregoing description that a positive or negative MAX produced when the numbered terminals are scanned is ambiguous, because the cursor could be over the left or right segment. Thus, if the MAX is positive when the two wires numbered "1" are grounded, the coarse cursor position is either circle-1 or circle-31. With this layout, the ambiguity is resolved by using a specially ordered wiring sequence. As will be noted, in the left segment, the numbered conductors are laid out in an ordered manner of 1 through 15, but in the right segment, the order is different, to wit, 1, 5, 9, 2, 4, 7, 8, 12, 3, 14, 10, 15, 13, 11. This sequence has been chosen such that no conductor on the right has the same numbered neighboring conductors as its counterpart on the left. Thus, for example, the "2" conductor in the left segment has the "1" conductor as its left neighbor and the "3" conductor as its right neighbor. In the right segment, the "2" conductor has as its left neighbor the "9" conductor and as its right neighbor the "4" conductor. Since MAX induced voltage values at a particular conductor are always accompanied by relatively high induced voltages in its left and right neighbors, then the segment half can be identified by determining the numbers of the conductors that have relatively high induced voltage values. So, for the example given, if the cursor were in the vicinity of the "2" conductor in the left segment, the induced voltages measured for the "1" or "3" conductors would be considerably higher than for the "4" or "9" conductors, thus unambiguously placing the cursor at coarse positions circle-2 or circle-5, depending upon polarity. Conversely, if the measured voltage values were higher for the "4" or "9" conductors, it would mean the cursor was over the "2" W in the right segment at coarse cursor locations circle-37 or circle-40. Fundamentally what has been accomplished is that, by scrambling the W conductor layout in one segment compared with that in the other segment, such that any pair or more of connected Ws simultaneously energized would have different neighboring Ws in each segment, it becomes possible by examining the induced voltages on the neighboring Ws to determine over which segment the pointing device coil is located. This in turn would allow a coarse location to be determined. The fine position would be determined by interpolation in teh same manner as with the previous preferred embodiment.

Since coarse location thus depends upon an examination of the magnitude of the signals induced when neighboring Ws are excited, it is desirable that the current flow through corresponding conductors be roughly the same. Therefore, for this embodiment with unbalanced line lengths, it is preferred to use the constant current circuitry illustrated in FIG. 12 to force the current flow in the conductors of the various Ws to substantially match. This is easily accomplished by subdividing each main bus 112 into two busses, one connected to all of the left outer conductors (102, 108..), and the other to all of the right outer conductors (102, 113 . . .), and then to connect each bus to one of the terminals labelled A and B in FIG. 12.

Figure 15:
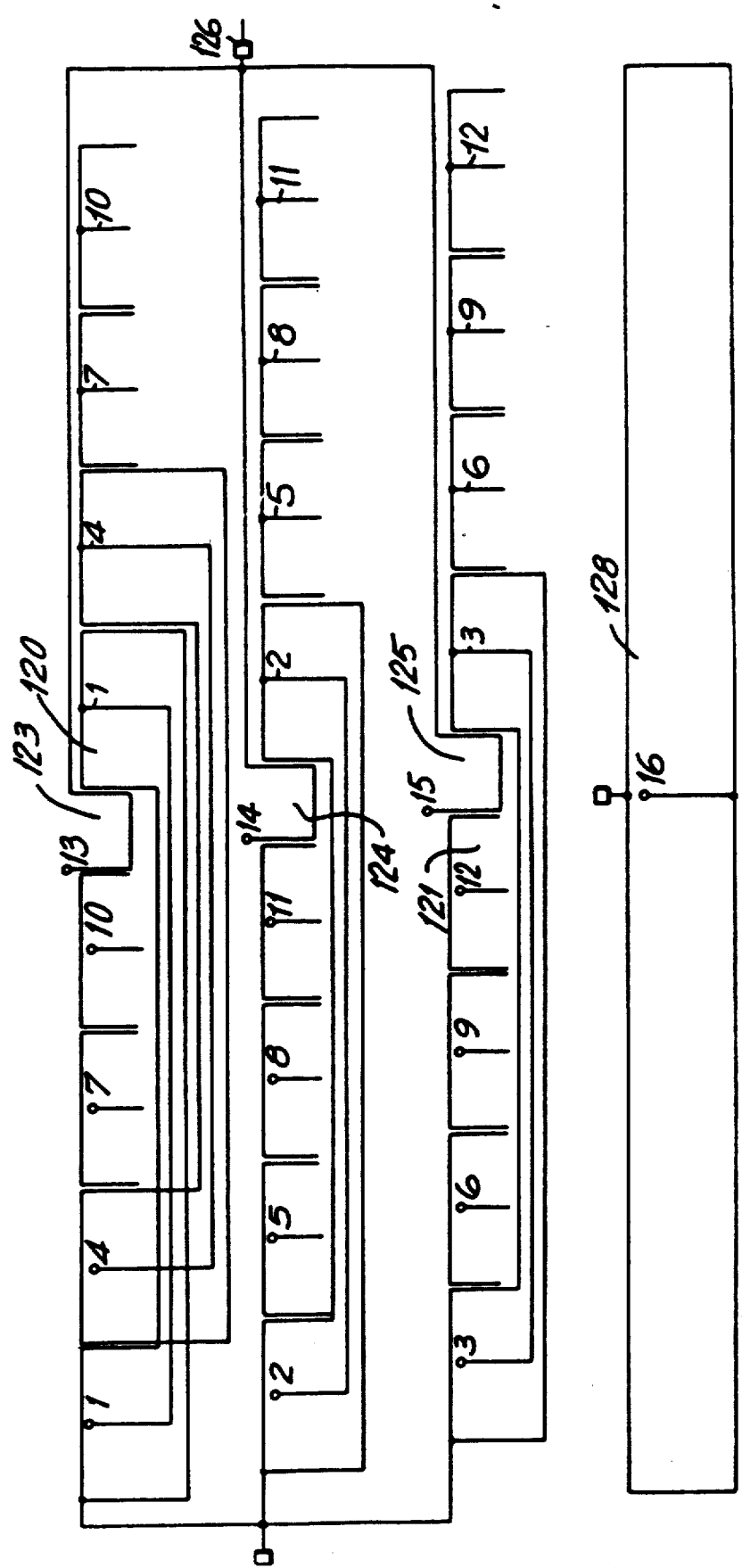
FIG. 15 shows the layout for a third modification which employs a different form of auxiliary windings.

FIG. 15 shows a third embodiment using W-configured grid conductors. This arrangement again provides a W of each wire in both the left and right segments. In this case, the layout in the left segment for the wires numbered 1..12 are in the same ordered sequence 1..12 in the right segment. Only a few of the horizontal connecting lines has been shown. As with the FIG. 14 embodiment, the active vertical conductors, which would actually overlap and interleave, are shown in separate rows for simplicity. To maintain the symmetry, the number "1" W 120 in the right segment begins to the right of where the number "12" W 121 in the left segment ends. This would leave empty vertical locations not filled with active vertical conductors. Hence, in this embodiment, that empty space in the center of the layout is filled by the provision of three U-shaped conductors 123, 124, 125 having numbered terminals "13", "14", and "15", which are commonly connected at the right side to a terminal 126. As in the FIG. 1 embodiment, a large W 128 is provided that spans the entire active area. The operation of this embodiment when the terminals numbered "1" through "12" are scanned is identical to that of the FIG. 1 embodiment. In other words, each W defines two coarse positions, depending on polarity, in the left segment, and two coarse positions, depending on polarity, in the right segment, and the polarity of the voltage induced when the large W 128 is scanned determines whether the cursor is over the left or right segment with respect to those 12 wires. When the cursor is over the center of the tablet, then its location relative to the U-shaped conductors 123, 124 and 125 is determined by the magnitude of the induced voltage when each of those 3 wires are scanned. Thus, a total of 51 coarse positions are defined, 48 by the polarity and magnitude of the induced voltages when wires "1". . . 12" are scanned, and 3 when wires "13"..15" are scanned. It will be evident to those skilled in the art how to map the induced voltages to specific coarse locations. Fine positions would be determined by interpolation similar to the manner described in connection with the FIG. 1 embodiment.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate, said electrode array comprising a plurality of individual elongated conductors capable of selective excitation or selective signal detection, each array conductor comprising at least three active parallel conductor portions distributed under the active tablet area, means interconnecting the active parallel conductor portions of each array conductor such that the current flowing in one of the parallel conductor portions is divided among the other parallel conductor portions, means selectively connectable to each array conductor such that excitation or induced currents flow simultaneously in all its parallel portions.

2. The digitizer tablet of claim 1, wherein the parallel conductor portions comprises a middle conductor portion in series with outer parallel conductor portions, whereby the current flowing in each outer portion is substantially one-half that flowing in the middle portion.

3. The digitizer tablet of claim 2, wherein the direction of current flow in the outer portions is opposite to that of the middle portions.

4. The digitizer tablet of claim 3, wherein each array conductor forms two connected sections located in different segments of the active tablet area, each section comprising a middle conductor portion and outer parallel conductor portions.

5. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate, said electrode array comprising a plurality of individual conductors capable of selective excitation or selective scanning, each array conductor comprising n equally-spaced, parallel, active portions where n is at least equal to 3, said n active portions comprising a common middle portion dividing into at least left and right outer portions such that any current carried by the common portion is divided substantially equally among the otter portions and flows in opposition to that of the outer portions, said pointing device having an inductive coil of a diameter that is less than the spacing between the common portion and the outer portions, means for connecting separately and selectively to each individual conductor a circuit for passing current therethrough or for detecting current induced therein such that for each unit of current passing through the common portion, substantially one-half of each unit current passes through each of the outer portions, first means for detecting the polarity and magnitude of tbe signal induced in each individual conductor or in the inductive coil when each individual conductor is excited, second means for determining from the detected signal polarity whether the pointing device is over the space between the common portion and the left or right outer portion.

6. The digitizer of claim 5, wherein each individual conductor comprises first and second interconnected spaced sections each comprising a common middle portion and left and right outer sections, and further comprising third means for determining whether the inductive coil is over the first or the second section of each conductor.

7. The digitizer of claim 6, wherein the third means comprises an additional individual conductor encompassing both the first and second conductor sections.

8. The digitizer of claim 7, further comprising means for determining from the magnitude of the induced signals a coarse location of the pointing device with respect to the electrode array.

9. The digitizer of claim 8, further comprising means for determining from the magnitude of the induced signals in adjacent conductors a fine location of the pointing device with respect to the electrode array.

10. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate, (a) said active tablet area being divided into at least first and second segments for said one tablet coordinate,
(b) said electrode array comprising a plurality of interleaved, individual, elongated conductors capable of selective excitation,
(c) each array conductor comprising three active connected conductor portions distributed under the active tablet area in such manner that:
  (i) three of the conductor portions are located in the first segment,
  (ii) three of the conductor portions are located in the second segment,
  (iii) the middle wire portion in each segment, when conveying current, conveys current in a direction opposite to that of the adjacent left and right parallel portions of each array conductor,
  (iv) the directly-connected corresponding wire portions in the different segments conveying current in a direction opposite to one another,
(d) means connected to the electrode array and the pointing device inductor for determining the pointing device location.

11. The digitizer tablet of claim 10, further comprising an additional elongated conductor having connected parallel portions in the first and second segments and conveying current in opposition when excited, and means connected to said additional elongated conductor for determining whether the pointing device is over the first or the second segment.

12. The digitizer tablet of claim 11, wherein the array conductors comprise fifteen individual conductors, and the additional elongated conductor is a sixteenth conductor.

13. The digitizer tablet of claim 11, wherein the location determining means comprises means for determining the polarity and magnitude of signals induced in the device inductor when each individual conductor is excited.

14. The digitizer tablet of claim 11, further comprising means for storing the polarity and magnitude of signals induced in the device inductor when each individual conductor is excited, and means for mapping the stored values to tablet coarse positions.

15. The digitizer tablet of claim 14, further comprising means for interpolating between stored signal magnitudes of adjacent individual conductors to determine pointing device fine positions.

16. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate,
  said electrode array comprising a plurality of individual conductors capable of selective excitation, each array conductor comprising n equally-spaced, parallel, active portions where n is at least equal to 3, said n active portions comprising a common middle portion dividing at a node into at least left and right outer portions,
  said pointing device having an inductive coil of a diameter that is less than the spacing between the common portion and an outer portion,
  means for connecting each end of the left and right active outer portions opposite to said node to a source of current,
  means for selectively connecting the end of each common middle portion opposite to said node to a point of reference potential, whereby when said end is connected to the reference potential, current flows along each outer portion and the sum of said currents flows through the common middle portion,
  first means for detecting the polarity and magnitude of the signal induced in the inductive coil when each individual conductor is excited,
  second means for determining from the detected signal polarity whether the pointing device is over the space between the common portion and the left or right outer portion.

17. The digitizer of claim 16, further comprising means in series with each of the left and right outer portions such that the same current flows through each when its common middle portion is connected to the reference potential.

18. The digitizer of claim 17, wherein the reference potential is ground potential.

19. The digitizer of claim 18, wherein the mean in series with the outer portions comprises constant current means.

20. The digitizer of claim 16, wherein each array conductor comprises a 3-legged W.

21. The digitizer of claim 20, wherein an extra individually-excitable conductor having an active portion spaced a distance from one of the outer portions substantially equal to that between the middle portion and one of the outer portions is connected to said node.

22. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate,
  (a) said active tablet area being divided into at least first and second segments for said one tablet coordinate,
  (b) said electrode array comprising a plurality of interleaved, individual, elongated conductors capable of selective excitation,
  (c) each of said array conductors comprising three active connected conductor portions distributed under the active tablet area in such manner that:
    (i) three of the conductor portions are located in the first segment,
    (ii) three of the conductor portions are located in the second segment,
    (iii) the middle wire portion in each segment, when conveying current, conveys current in a direction opposite to that of the adjacent left and right parallel portions of each array conductor,
    (iv) the directly-connected corresponding wire portions in the different segments conveying current in the same direction, relative to one another,
  (d) means connected to the electrode array and the pointing device inductor for determining the pointing device location.

23. The digitizer tablet of claim 22, wherein the layout of the conductor positions in the first segment is different from the layout of the corresponding conductor portions in the second segment such that no conductor portion in the second segment has the same neighboring conductors it has in the first segment.

24. The digitizer tablet of claim 23, wherein the array conductors comprise fifteen connected conductors defining sixty course positions.

25. The digitizer tablet of claim 23, wherein the location determining means comprises means for determining the polarity and magnitude of signals induced in the device inductor when each individual conductor is excited.

26. An electromagnetic digitizer tablet having an electrode array under an active tablet area and a pointing device having an inductor, the combination when energized with the pointing device over the electrode array will generate electrical signals representative of the pointing device location over the array with respect to at least one tablet coordinate,
   (a) said active tablet area being divided into at least first and second segments for said one tablet coordinate,
   (b) said electrode array comprising a plurality of interleaved, individual, elongated conductors capable of selective excitation,
   (c) each of said array conductors comprising three active connected conductor portions distributed under the active tablet area in such manner that:
      (i) three of the conductor portions are located in the first segment,
      (ii) three of the conductor portions are located in the second segment,
      (iii) the middle wire portion in each segment, when conveying current, conveys current in a direction opposite to that of the adjacent left and right parallel portions of each array conductor,
      (iv) the directly-connected corresponding wire portions in the different segments conveying current in a direction opposite site to one another,
   (d) said electrode array further comprising at least one additional U-shaped conductor located near the center of the tablet,
   (e) means connected to the electrode array and the pointing device inductor for determining the pointing device location.

27. The digitizer tablet of claim 26, further comprising an additional elongated conductor having connected parallel portions in the first and second segments and conveying current in opposition when excited, and means connected to said additional elongated conductor for determining whether the pointing device is over the first or the second segment.

28. The digitizer tablet of claim 27, wherein the array conductors comprise twelve W-configured conductors, three U-shaped conductors, and the additional elongated conductor is a sixteenth conductor.

29. The digitizer tablet of claim 27, wherein the location determining means comprises means for determining the polarity and magnitude of signals induced in the device inductor when each individual conductor is excited.

30. A method of determining the position of a pointing device over an electromagnetic digitizer tablet having an electrode array made up of a plurality of individual elongated conductors, with each individual conductor having a W configuration bent into a general U shape to define at least three active parallel portions in each of plural segments of the tablet to define two coarse positions per active parallel portion, comprising the steps:
   (a) storing the polarity and magnitude of signals induced in the pointing device when each individual conductor is excited or induced in each individual conductor when the pointing device is excited,
   (b) determining from the stored signal magnitudes the individual conductor closest to the pointing device,
   (c) determining from the stored signal polarities whether the pointing device is to the left side or the right side of the said conductor determined in step (b).

31. The method of claim 30, further comprising the step of determining from the magnitude differences of the said conductor and its adjacent conductors a fine location of the pointing device.

32. The method of claim 31, wherein a further conductor is provided, said further conductor generating a signal whose polarity determines which segment of the tablet the pointing device is over, said method comprising using said polarity to determine the tablet segment over which said pointing device rests.

33. The method of claim 32, wherein the polarity and magnitude values are stored in memory locations mapped to tablet coarse positions, and the signal polarity from the further conductor is used to determine which memory locations are accessed to determine tablet coarse positions.

34. The method of claim 33, wherein fine location is determined by using the ratio of the difference in signal magnitudes of the closest conductor with an adjacent conductor to the sum of the differences in signal magnitudes of the closest conductor with each of its adjacent conductors.

* * * * *

UNITED STATES PATENT AND TRADEMARK OFFICE
CERTIFICATE OF CORRECTION

PATENT NO. : 4,996,393
DATED : February 26, 1991
INVENTOR(S) : Thomas C. Zalenski, et al.

It is certified that error appears in the above-identified patent and that said Letters Patent is hereby corrected as shown below:

```
Column 2, line 5, change "eac" to --each--;
          line 19, change "eac" to --each--;
          line 46, after "function" insert --of--.
Column 5, line 30, change "20(#11)" to --20(#1)--.
Column 9, line 61, change "scrambled" to --scrambled
or--.
Column 11, line 25, omit "L".
Column 13, line 4, change "4" to --5--.
Column 14, line 43, change "teh" to --the--.
 Column 16, line 24, change "otter" should read --outer--.
Column 16, line 37, change "tbe" to --the--.
Column 19, line 36, omit "site".
```

Signed and Sealed this

Ninth Day of March, 1993

Attest:

STEPHEN G. KUNIN

Attesting Officer

Acting Commissioner of Patents and Trademarks